Figure 1:
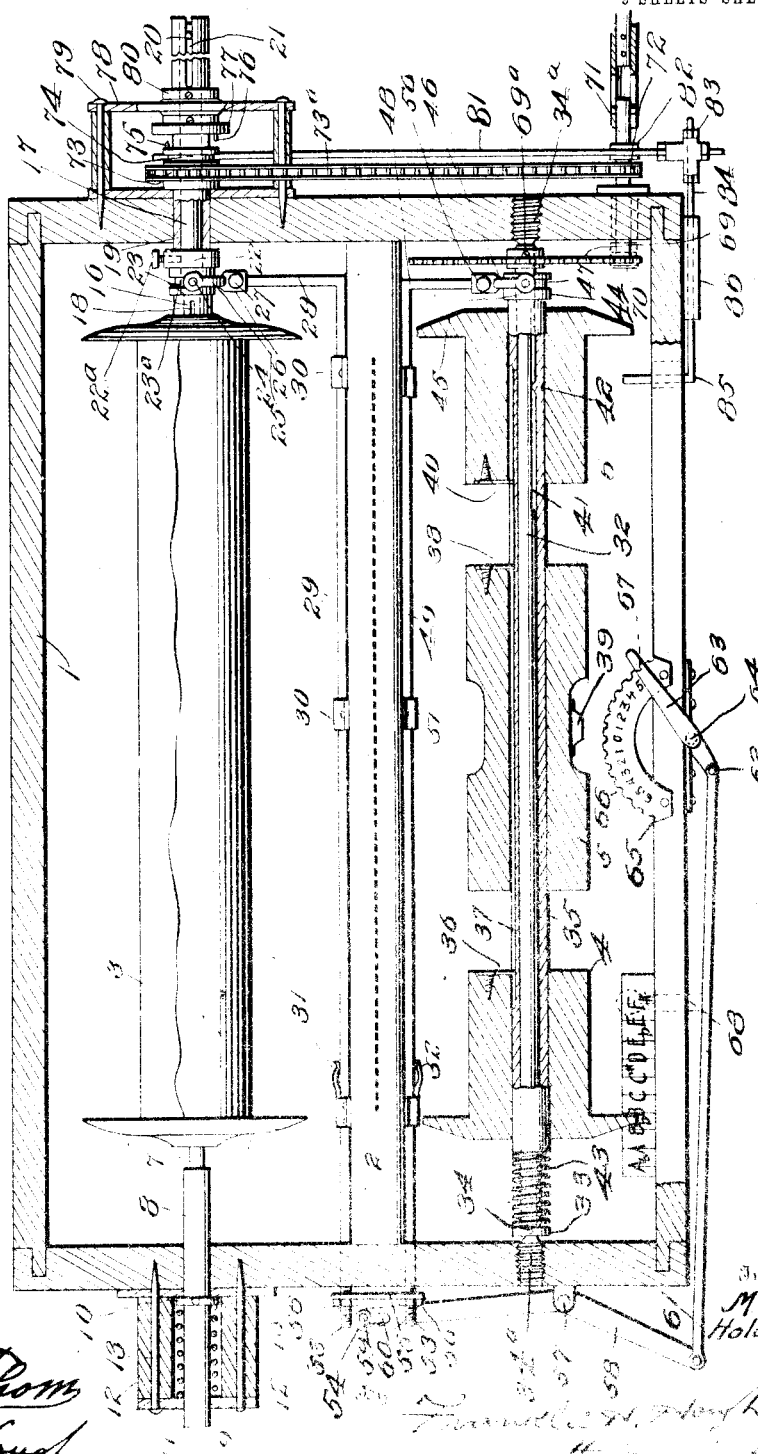

M. F. HOLDERMAN.
KEY CHANGING DEVICE FOR PIANO PLAYERS AND PLAYER PIANOS.
APPLICATION FILED JULY 9, 1909.

1,030,182.

Patented June 18, 1912.

9 SHEETS—SHEET 1.

Witnesses

Inventor
M. F. Holderman,

Attorney

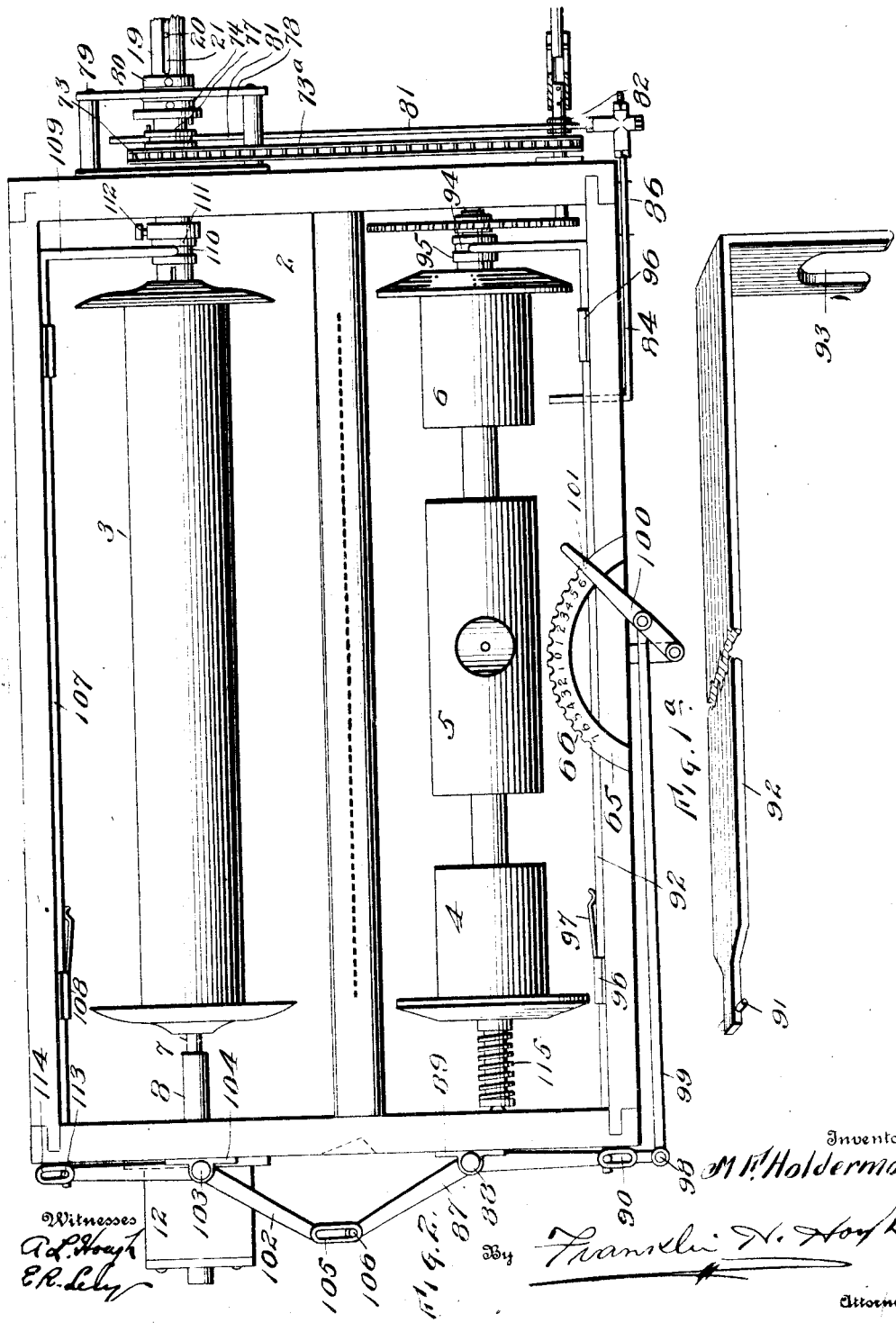

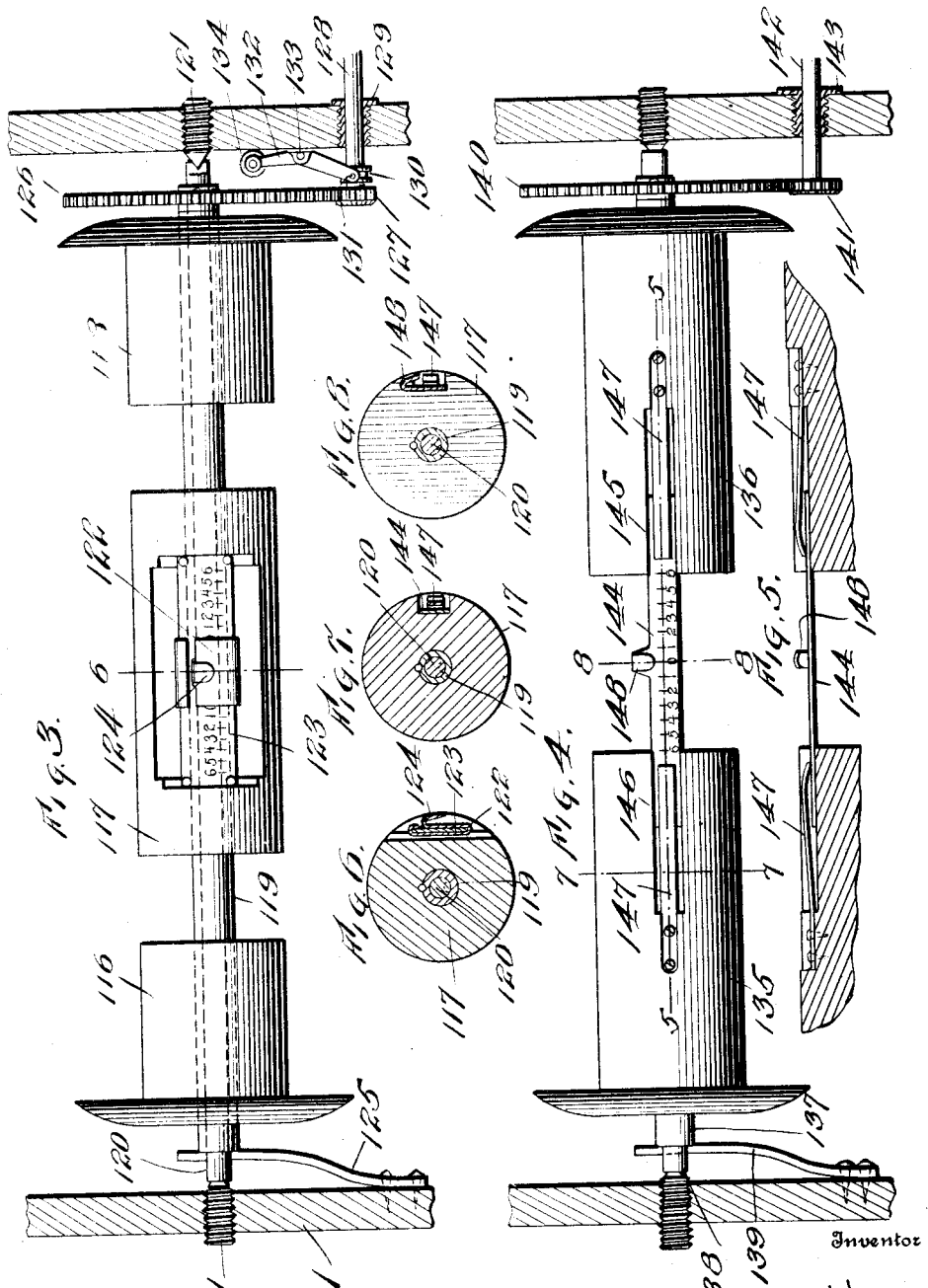

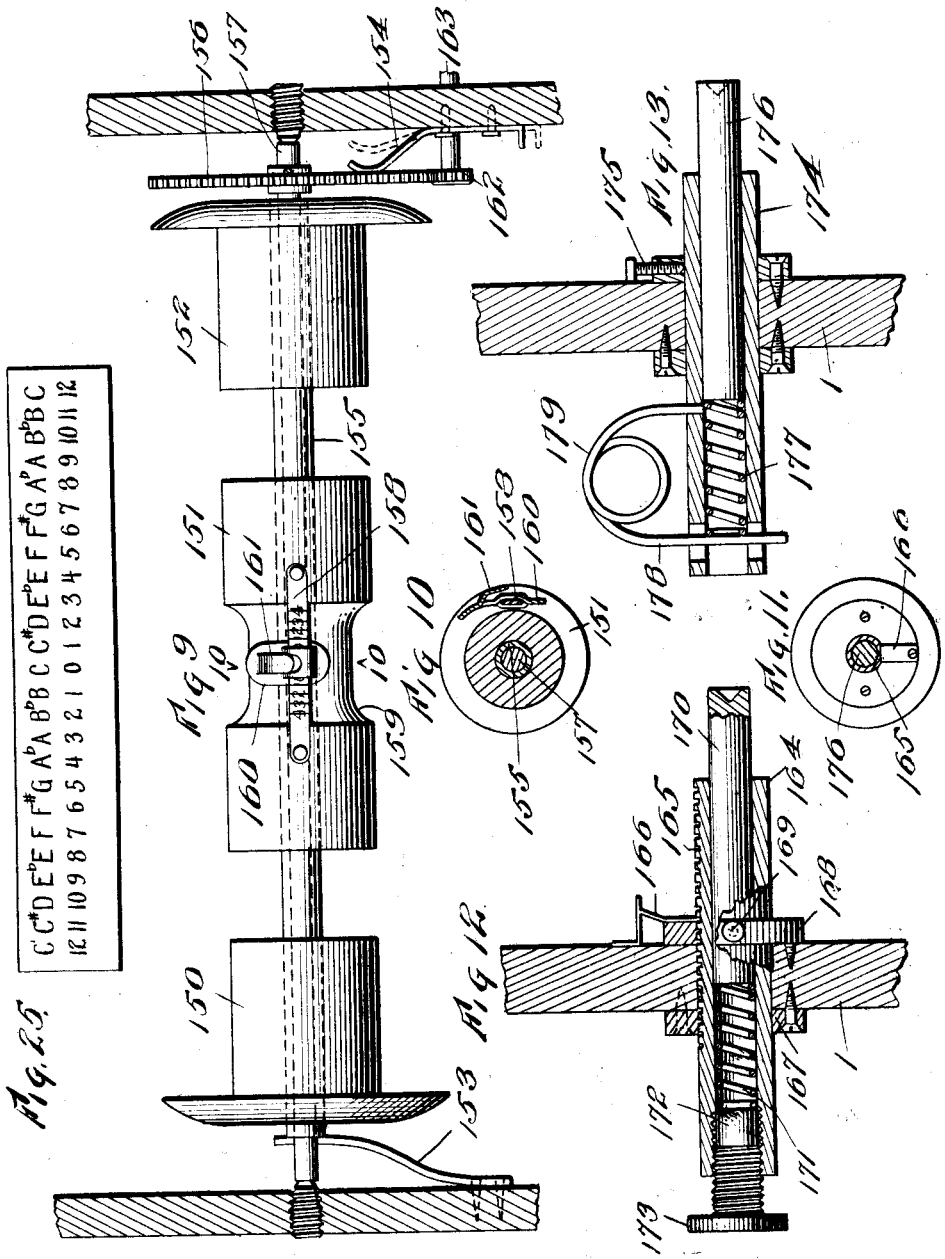

M. F. HOLDERMAN.
KEY CHANGING DEVICE FOR PIANO PLAYERS AND PLAYER PIANOS.
APPLICATION FILED JULY 9, 1909.
1,030,182.
Patented June 18, 1912.
9 SHEETS—SHEET 5.
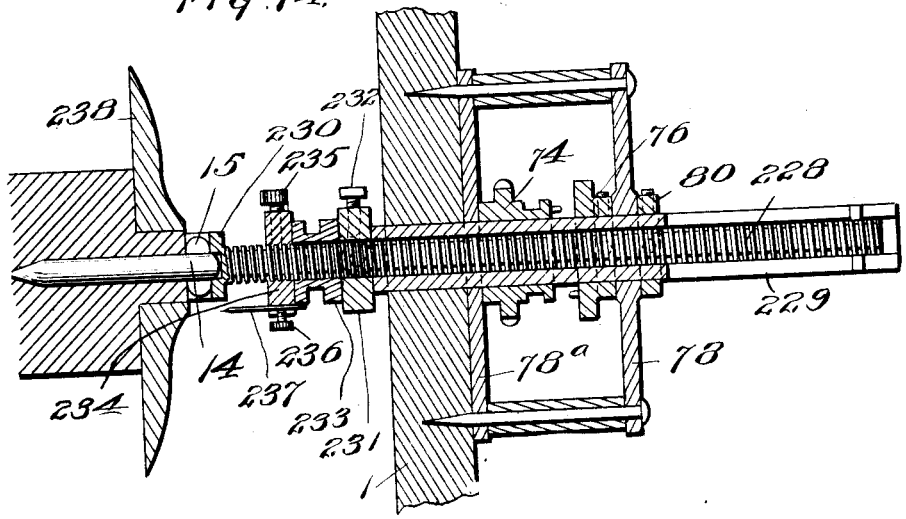
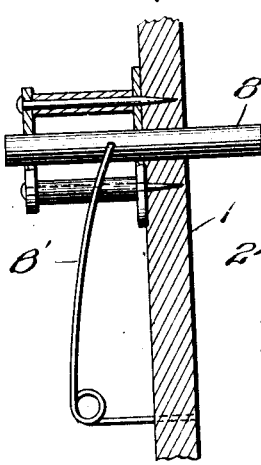
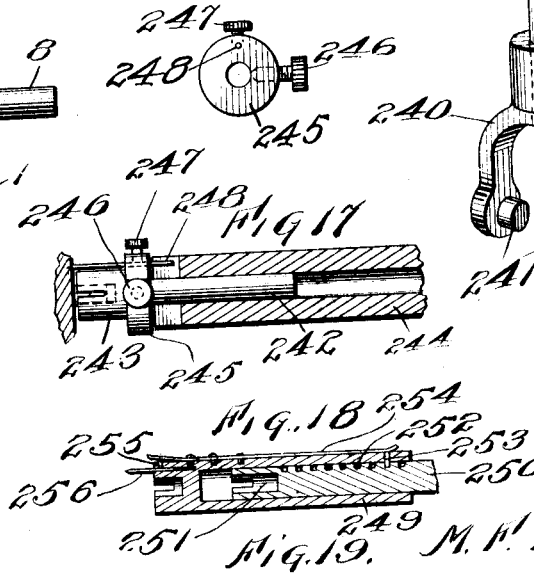
Witnesses
Geo. L. Thom
A. L. Hough
Inventor
M. F. Holderman.
By Franklin H. Hough
Attorney

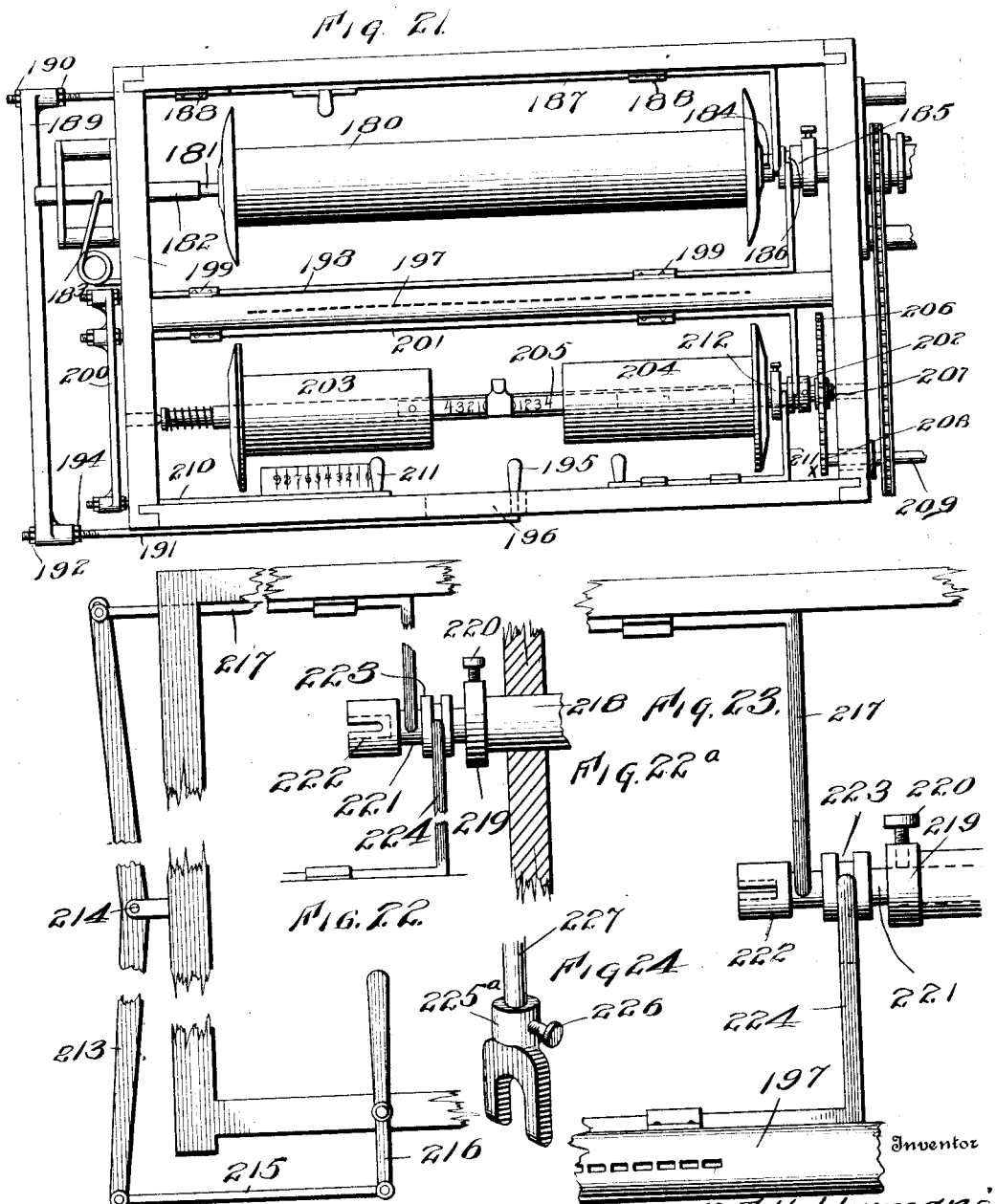

M. F. HOLDERMAN.
KEY CHANGING DEVICE FOR PIANO PLAYERS AND PLAYER PIANOS.
APPLICATION FILED JULY 9, 1909.

1,030,182.

Patented June 18, 1912.
9 SHEETS—SHEET 7.

FIG. 26.

WITNESSES:

INVENTOR
M. F. Holderman.
By Franklin M. Hough
Attorney

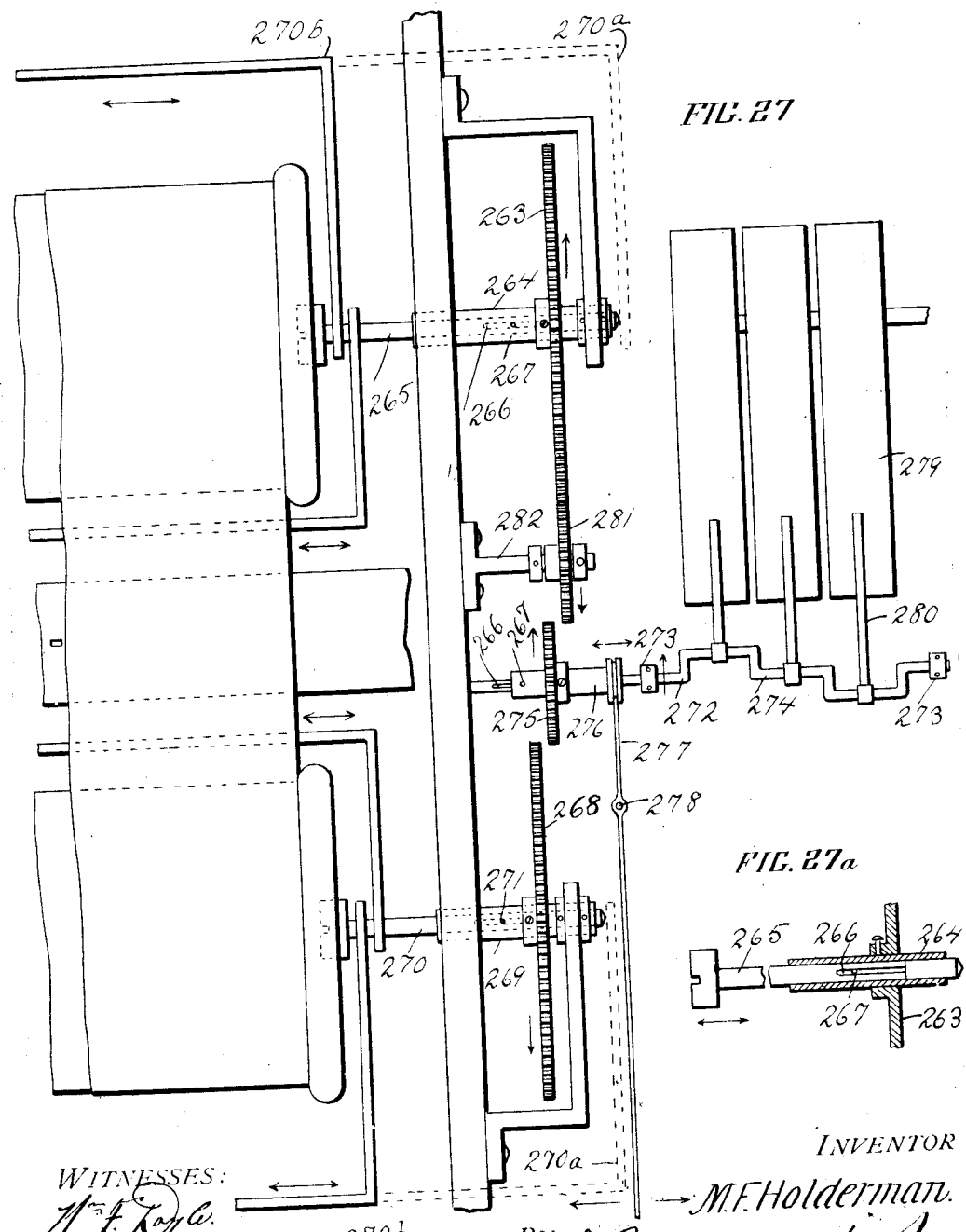

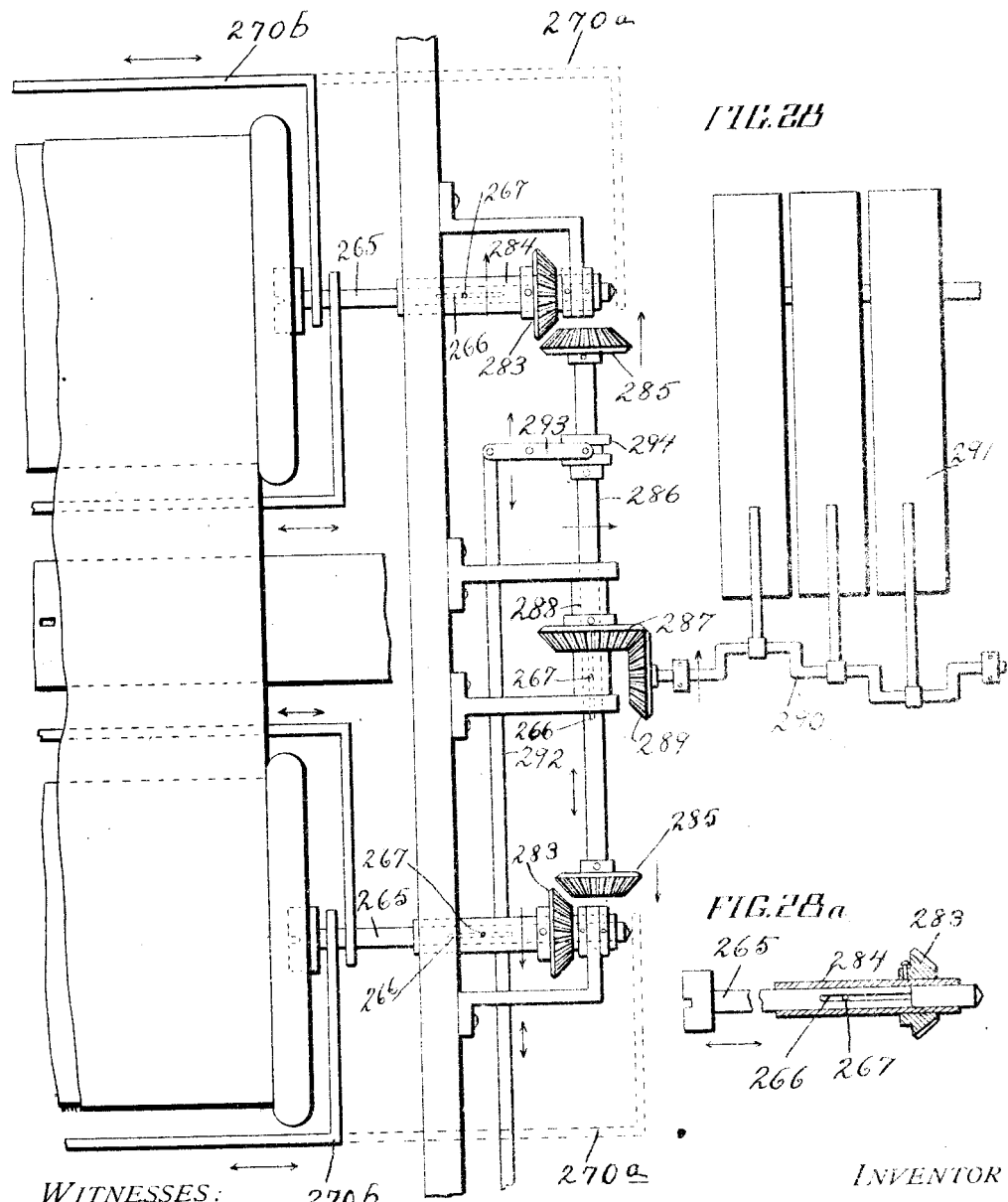

UNITED STATES PATENT OFFICE.

MARION F. HOLDERMAN, OF WASHINGTON, DISTRICT OF COLUMBIA.

KEY-CHANGING DEVICE FOR PIANO-PLAYERS AND PLAYER-PIANOS.

1,030,182.  Specification of Letters Patent.  Patented June 18, 1912.

Application filed July 9, 1909. Serial No. 506,837.

*To all whom it may concern:*

Be it known that I, MARION F. HOLDERMAN, a citizen of the United States, residing at Washington, in the District of Columbia, have invented certain new and useful Improvements in Key-Changing Devices for Piano-Players and Player-Pianos; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in piano players or player pianos and other instruments and comprises means whereby one or the other, or both, of the spools, adapted to carry the perforated music sheets, may be moved longitudinally for the purpose of playing a piece of music in any of the different keys, or to make the music sheet track, or run true to prevent tearing of the edges of the music sheet on the end flanges of the music spools in playing or rewinding, and indicating means showing the key or keys and the different adjustments.

The invention consists further in the provision of longitudinally adjustable spools or reels of piano players, thus adapting the apparatus for using perforated sheets of different widths, and providing mechanism whereby one spool or another may be extended or shortened.

The invention comprises various details of construction, combinations and arrangements of parts which will be hereinafter fully described and then specifically defined in the appended claims.

I illustrate my invention in the accompanying drawings, in which—

Figure 1 is a side elevation of my improved apparatus. Fig. 1ª is a detail perspective view of a spool moving member. Fig. 2 is a sectional view showing a modified form of the means for moving the spools longitudinally. Fig. 3 is a sectional view through a portion of a well of a piano player showing sections of a spool mounted therein. Fig. 4 is a similar view showing a slight modification of the construction of the spools. Fig. 5 is a sectional view on line 5—5 of Fig. 4. Fig. 6 is a central sectional view on line 6—6 of Fig. 3. Fig. 7 is a cross sectional view on line 7—7 of Fig. 4. Fig. 8 is a sectional view on line 8—8 of Fig. 4. Fig. 9 is a sectional view through a well illustrating a slightly modified form of spool. Fig. 10 is a sectional view on line 10—10 of Fig. 9. Fig. 11 is an end view of the inner end of one of the sections of the spool shown in Fig. 9. Fig. 12 is a sectional view showing a modified form of adjusting means for holding the spindles of spools. Fig. 13 is a sectional view of a still different modification of the tension means for holding the spindles. Fig. 14 is a detail sectional view of the modified form of adjusting means for holding spools. Fig. 15 is a detail perspective view showing spring-actuated means for holding a spindle end. Fig. 16 is a detail view of an adjusting collar upon the spindle holding mechanism. Fig. 17 is a sectional view of a modified form of means for engaging and holding the spool. Fig. 18 is a modified form of the construction shown in Fig. 17. Fig. 19 is a detail view of a disk at the end of a spool. Fig. 20 is a modified form of clutch mechanism for engaging a movable collar. Fig. 21 is a side elevation showing modified forms of mechanism for moving the spools. Figs. 22 and 22ª are elevations of parts of the well of a piano player showing the modified means for moving the spools. Fig. 23 is a detail in elevation showing part of a trackerboard, socket member for holding the spool and means for moving the same. Fig. 24 is a detail view of a forked clutch-throwing member, Fig. 25 is an enlarged detail view of an indicating card. Fig. 26 is an enlarged detail view of my indicating card showing the different keys into which a piece of music may be transposed no matter in what key the piece is perforated. The letters show the key and the figures show the number of perforations the music sheet is to be moved to the right or left for the key desired. For instance, should the piece be perforated in the key of C, moving the sheet two holes to the right would raise the piece two tones and it would be played in the key of D, or if it is desired to lower the piece three tones, by moving the sheet to the left it would be played in the key of A. Thus any transposition can be made to suit the performer by moving the music sheet to the right or left. Fig. 27 is a view showing gear construction instead of a sprocket chain or belt and the angle bars on the outside and on the inside of the well. Fig. 27ª is a detail view showing a modified form of the end supports for the spools. Fig. 28 is a view showing bevel gear construction instead of a sprocket chain or belt and the angle bars on the outside and inside of the well. Fig. 28ª is a detail view showing a modified form of the end supports for the music spools.

Reference now being had to the details of the drawings by numerals, 1 designates the well of a piano player and 2 a trackerboard which is fixed to the well, and 3 is the upper spool, and numerals 4, 5 and 6 designate sections of the lower spool. Said upper spool has a spindle end 7 adapted to engage a yielding spindle-receiving socket member 8, which has a yielding movement under the tension of the spring 9, as shown clearly in Fig. 1 of the drawings, and which spring is interposed between a collar 10 fixed to the socket member 8 and a plate 11 which is held to the edges of the plates 12 by means of the screws or other fastening means 13. The opposite end of the spool 3 is provided with a spindle 14 having wings 15 thereon at positions diametrically opposite and as shown in Fig. 14 of the drawings. A socket member 16 is formed at the end of the rod 17 and is provided with slots 18 for the reception of said wings whereby, as the rod 17 rotates, the reel or spool 3 will be caused to rotate therewith.

Mounted in an aperture in one end of the well is a tubular shell 19, through which the rod 17 passes, and pins 20 project from the rod 17 and extend through the slots 21 formed in the tubular shell at positions diametrically opposite as shown clearly in Fig. 2 of the drawings. By this construction, it will be noted that the rod 17 is splined to the shell 19 but is caused to rotate therewith. A collar 22 is mounted upon the rod 17 and has a set screw 22ª adapted to hold the same in a fixed position upon the rod 17. Mounted upon rod 17 is a revolving clutch collar 23 with an annular groove 23ª formed therein and in which the pins 24 carried by the Y-shaped clutch arms 25 are positioned. Said member 25 is provided with a socket 26 in which a set screw 27 is mounted and adapted to engage the upper angled end 28 of the spool-throwing rod 29. Said rod 29 is mounted in a bearing 30 upon the trackerboard 2 and has a longitudinal movement thereon and is adapted to have a movement through an aperture in the angled wing of the plate 55. A spring 31 projects from one of said bearings 30 and is adapted to bear yieldingly against the rod 29, to hold the same from accidental movement.

The lower spool, which is made up of three sections 4, 5 and 6, shown in section in Fig. 1 of the drawings, is provided with a solid shaft 32 mounted in a tubular shaft 35. One end of said shaft 32 has a collar 33 fastened thereto by means of a set screw 34 and said shaft 32 has indentures in its ends forming bearings for the pointed ends of the screws 34ª which are mounted in the threaded aperture in the ends of the well. The section 4 has a finger 36 fastened to its inner end which is adapted to engage a slot 37 formed longitudinally in the tubular shaft 35 and forming means for causing the spool section 4 to rotate with the tubular shaft 35. The central section 5 of the lower spool is mounted to have a longitudinal movement upon the tubular shaft 35 and is also provided with a finger 38 upon one end thereof which engages the groove 37 and said central section is provided with a hook 39 for engagement with the eye or ring at the end of a perforated sheet of music. The third section 6 has a finger 40 fastened to its inner end and engages the slot 37 in the same manner as described of the other fingers 36 and 38.

Upon reference to Fig. 1 of the drawings, it will be noted that the shaft 32 at one end is provided with a longitudinal groove 41 and the inner surface of the tubular shaft has a lug 42 struck up therefrom and adapted to engage said slot 41 and serve as means for causing the two shafts 32 and 35 to rotate together and allowing the same to have independent longitudinal movements. A coiled spring 43 is mounted upon the shaft 32 adjacent to one end thereof and bears between the collar 33 and the adjacent end of the tubular shaft 35, the collar 33 being adjustable to regulate the tension of said spring.

A loose collar 44 is mounted upon the shaft 32 adjacent to one end thereof and pins 45 upon the forked arms 46 of the clutch-throwing member engage a groove 47 in said collar 44 and the angled end 48 of the spool throwing rod 49 engages the socket end of the member 46 and is held in adjusted position therein by means of the set screw 50. The rod 49 is mounted in bearing members 51 upon the under side of the trackerboard and a spring 52 projecting from one of said bearing members bears yieldingly against the rod 49. The rod 49 also has a longitudinal movement through an aperture in the wing of the plate 54 similar to that before described of rod 29, thus allowing the rods to have independent movements. The ends of the two rods 29 and 49, shown at the left in Fig. 1 of the drawings, each is threaded as at 53, and 54 is a plate having an angled edge 55 which is perforated for the reception of the ends of the rods 29 and 49. Nuts 56 are mounted upon said threaded ends of said rods, said plate 54 serving to limit the longitudinal movements of the rods 29 and 49 in one direction.

Pivotally mounted upon a pin 57 upon one end of the well of a piano player is an angled lever 58, one end of which carries a pin 59 having a play in an elongated slot 60 in said plate 54 and its other end is pivotally connected to a rod 61 which in turn is pivotally connected at 62 to an operating lever 63, which latter is mounted upon the pivot 64 journaled underneath the well of the piano player. A segment dial, designated by numeral 65, is fastened to the well of a piano player and has a series of numerals thereon representing the number of apertures it will be necessary to move the spools to play pieces in different keys. The upper convexed edge of said segment plate is provided with a series of scallops 66 and a pin 67 projects from the lever 63, which latter is of a resilient material, and is adapted to spring into one or another of the scallops 66 to hold the lever in an adjusted position. A handle 68 upon the rod 61 is afforded as additional means for moving the bar 61 as desired or it may be used as a pointer having back of it an indicating card with the different keys upon it. The segment dial may also have the different keys as well as the numerals.

The shaft 32 has a gear wheel 69 which is fixed thereto by set screws 69ᵃ and is adapted to mesh with a gear wheel mounted upon the longitudinally movable shaft 71. A sprocket wheel 72 is fixed to the shaft 71 and a sprocket chain 73ᵃ passes about the sprocket wheel 72 and the sprocket wheel 73 which turns freely on the tubular shaft 19. The hub of the sprocket wheel 73 is provided with an annular groove 74 and a pin 75 projects from the side of said hub and is adapted, when moved in one direction to be positioned so as to contact with a pin 76 which projects from the collar 77 which is keyed to the tubular shell 19 upon one side of the plate 78 which is held to the well by means of the screws 79. Another collar 80 is mounted upon the outside of the plate 78 and held by means of a set screw upon the tubular shaft 19. In order to move the shaft 71 and the wheel 73 simultaneously, I provide a bar 81 one end of which is forked and engages the annular groove 74 in the hub portion of the sprocket wheel 73 and its other end engages a grooved collar 82 which is held by a set screw upon the shaft 71. A bar 84 is fixed to the bar 81 and has a longitudinally movable lever 85 connected thereto and movable in a suitable guideway 86 upon the well of the piano player.

Referring to Fig. 2 of the drawings, I have shown a slight modification of means for moving the spools simultaneously in the same directions, in which an angle lever 87 is provided and which is pivotally mounted upon the pin 88 in a suitable bearing 89 at one end of the well, and one arm of the lever 87 has an elongated slot 90 formed therein for the reception of a pin 91, shown clearly in Fig. 1ᵃ of the drawings, which pin projects laterally from the contact end of the spool-operating bar 92, which latter has one end angled and recessed as at 93. Said recess is adapted to engage the groove 94 of the clutch collar 95 and the bar 92 is guided in its longitudinal movements by the straps 96 which are fastened to the lower side of the well. A spring 97 projects from one of the straps 96 and bears yieldingly against the bar 92 to hold the same frictionally against accidental movement. The lower end of the lever 87 is pivotally connected by means of a pin 98 with one end of the bar 99 which in turn is pivotally connected to the operating lever 100 having a pin 101 for engagement with one or another of the scallops 66 formed in the segment scale bar 65, it being understood that the lever 100 is made of a resilient material so as to spring laterally to allow the pin carried thereby to engage or to be disengaged from one of the scallops or notches formed in the bar 65. A second angle lever, designated by numeral 102, is pivotally mounted upon a pin 103 and a bearing 104 upon the well and one arm of the lever 102 is provided with an elongated slot 105 in which a pin 106 carried by the lever 87 is adapted to have a play. A bar 107, similar in construction to the bar 92, is held to the under face of the upper side of the well by means of straps 108 and has its angled end 109 recessed and engaging an annular groove 110 formed in the clutch collar 111, which latter is held by means of a set screw 112 in adjusted position upon the rod 17. A pin 113 mounted upon the bar 107 engages a slot 114 formed in one end of the lever 102.

From the foregoing description of the mechanism shown in Fig. 2, it will be noted that means is afforded whereby as the operating lever 100 is moved in one direction or the other, the two spools may be moved in one direction and returned to their normal portions by the spring 115 which is mounted upon rod 32 and presses against shell 35 and by means of a spring 9, shown in Fig. 1 of the drawings, and contained between the sides 12 of the boxing shown in Fig. 1.

In Fig. 3 of the drawings, I have shown the two spools, each made up of a plurality of sections, the lower spool having the three sections 116, 117 and 118 mounted to move upon the tubular shaft 119 through which a solid shaft 120 passes, which latter has indentures at its ends forming bearings for the set screws 121 in the opposite walls of the well. The intermediate section 117 of the lower spool is provided with a slip 122 which is movable over the edges of the scale 123 and is provided with a hook 124 for engagement with the usual eye or ring upon the end of a perforated sheet of music. The figures upon the scale 123 are adapted to indicate the number of perforations it will be necessary to move the music in order to play the piece in various keys, or for adjustment for rolls of different widths. A spring 125 is fastened to the inner face of the well and bears yieldingly against the tubular shaft 119 and serves to normally hold the same in the position shown in Fig. 3 of the drawings. A gear wheel 126 is fastened by a set screw to the solid shaft 120 and is adapted to mesh with the gear wheel 127 which is fixed to the power driven shaft 128 journaled in a bearing 129 in one end of the well. Said shaft 128 has a grooved collar 130 fixed thereto in which a pin 131 extends carried by the angle lever 132, which latter is mounted upon a pivot pin 133 in one end of the well. An antifriction roller 134 is pivoted at one end of the angle lever 132 and is adapted, as the latter is tilted upon its pivot, to contact with the outer face of the gear wheel 126 and cause the tubular shaft 119 to move longitudinally against the tension of the spring 125 and thus causing the music to rewind tightly simultaneously with the movement of the gear wheel with the shaft 120, the gear wheel 127 will be withdrawn from mesh with the gear wheel 126 thus allowing the upper spool to rotate independently of the gear wheel 127 when the perforated strip is being rewound upon the other spool.

The lower spool shown in Fig. 4 is made up of two sections, designated by numerals 135 and 136, mounted upon a tubular shaft 137, which latter is in turn mounted upon a solid shaft 138 in a similar manner as described of the upper spool and a spring 139 bears yieldingly against the end of the tubular shaft 137. A gear wheel 140 is fixed by a set screw to the solid shaft and meshes with a gear wheel 141 which is fixed to the shaft 142 journaled in the bearing 143, which shaft 142 is adapted to have a longitudinal movement to throw the gear wheel 141 and gear wheel 140 into and out of mesh. A scale bar, designated by numeral 144, is mounted with its ends one in each of the slots 145 and 146 and springs 147, one fastened to each section, are adapted to bear yielding against the bar 144 as shown clearly in Figs. 4 and 5 of the drawings, serving to hold the spindles frictionally in adjusted position. The bar 144 has a hook 148 for engagement with the ring upon the end of the perforated sheet of music.

Referring to Fig. 9 of the drawings. I have shown a spool, made up of three sections 150, 151 and 152 mounted in the manner shown in Fig. 3 and having two springs, designated by numerals 153 and 154, secured one to each opposite side of the well, the former spring bearing against the end of the tubular shaft 155 upon which the sections are mounted, while the spring 154 bears against the gear wheel 156 which is mounted upon the shaft 157 and makes the music rewind tight. The central section 151 is provided with the scale bar 158 bridging a central recess 159, and 160 is a clip having slits therein for the reception of said scale bar.

161 is a hook upon said clip for engagement with the eye or ring at the end of the perforated sheet of music. A gear wheel 162 is fixed to a longitudinally movable shaft 163 and meshes with the gear wheel 156.

In Fig. 12, I have shown a slight modification of a detail of my invention in which the tubular shell 164 is mounted to have a longitudinal movement in one end of the well and has a series of notches 165 formed therein to receive the spring pawl 166 fastened at one end to the well. Said tubular shell 164 also passes through the plates 167 and 168 fastened to the opposite faces of one end of the well, and a set screw 169 passes through the plate 168 and is adapted to engage and hold the tubular shell 164 in a fixed position. A spindle holding bearing member, designated by numeral 170, is mounted in the tubular shell 164 and bears yieldingly against a coiled spring 171 mounted within the shell 164, and 172 is a plug fitted within the shell 164 and against which said spring 171 is adapted to bear. A threaded plug 173 is mounted in the threaded end of the shell 164 and is adapted to regulate the tension of the spring 171. By this provision, it will be noted that the spindle 170 will yield and the tension of the spring bearing against the spindle may be regulated by the threaded plug 172. By the provision of the adjusting features described and the shell 165 provided with notches adapted to be engaged by the pawl 166, the device may be adjusted for holding spools or reels of different lengths as may be necessary with different makes of music.

In Fig. 13, I have shown a slight modification of the mechanism illustrated in Fig. 12 in which the tubular shell 174, which passes through an aperture in the wall of the well, is held in adjusted position by means of a set screw 175 and carries a yielding spindle-receiving bearing member 176. A spring 177 is mounted within the shell 174 and against which one end of the member 176 bears while its other end bears against one end of a spring 178 and turned into a coil 179 with one end engaging the shell 174.

By the construction of the modified form illustrated in Fig. 13, means is afforded for increasing the tension upon the end of the spindle 176, by reason of the additional spring 179 adapting this modified form for use in connection with reels or spindles of different lengths the shell 174 being held in adjusted positions by the set screw 175.

In Fig. 21, I have shown modified means for moving the spools in which mechanism is illustrated, means for moving the two spools together or one independent of the other and in which drawings the upper spool 180, which is provided with a spindle 181, is mounted in a yielding spindle socket member 182 with which a spring 183 engages at one end and its other end is fastened to the frame of the well. The spindle at one end of the spool 180 engages a socket member 184 upon which a clutch collar 185 is mounted having an annular groove 186. A longitudinally movable bar 187 is guided in its movements by the straps 188 upon the under edge of the top of the well and has an angled end which is forked and bearing against the socket member 184. One end of the bar 187 is threaded and passes through an opening in the vertically disposed bar 189 and nuts 190 are mounted for the reception of the threaded end of the bar 187, one upon each side of the bar 189. The lower end of the bar 189 receives a rod 191 which is threaded and provided with nuts 192. Said rod 191 has a handle 195 at an angle thereto and which passes up through an opening 196 at the bottom of the well.

Mounted upon the upper edge of the trackerboard 197 is a rod 198 confined to the trackerboard by the straps 199 and has one end angled and extending into the annular groove 186 formed in the clutch collar 185 and its other end is threaded and passes through an opening in the bar 200. A second rod 201, similar to the rod 198, is mounted upon the under edge of the trackerboard and has an angled end engaging a clutch 202 which is mounted upon the solid spindle of the lower spool.

In Fig. 21, I have shown the lower spool as made up of two sections, designated respectively by numerals 203 and 204, with a graduated scale 205 connecting the same. A gear wheel 206 is fastened to the shaft 207 and is in mesh with a gear wheel 208 upon the longitudinally movable shaft 209. The lower end of the bar 200 is fastened to the bar 210 having a handle 211 thereon, forming means whereby the two bars 198 and 201 may be moved simultaneously for moving the two spools. An angled bar 211˟, mounted upon the lower end of the well, has a forked end positioned adjacent to the collar 212 and forms means whereby the lower spool may be moved independent of the upper one.

In Fig. 21, as shown in the drawing, it will be noted that, by the two operating bars for a single shaft or spool, independent movements of the spools can be made. That the two middle bars will move both spools simultaneously together for the purpose of transposing or changing the key. That the upper bar will move the upper spool to make the music track. That the lower bar will move the lower spool to make the music run true and thus prevent the tearing of the edges of the music sheet on the end flanges of the music spools in playing or rewinding. That by the three levers and four bars the music spools have three independent movements and accomplish three different and important things, as well as indicating the key or keys and adjustments of the spools, or music sheet. Also that the music sheet and spools may be adjusted to play in any key, or to track, or run true, independent of the angle bars by means of the extension spindles in conjunction with the sectional take-up or winding spool, should any of the bars become broken or inoperative, thus this invention comprises two independent systems of producing the results contemplated.

In Fig. 22 I have shown a modified form of the apparatus in which an angle lever 213 is mounted upon a pivot 214 and has pivoted at one end a rod 215 which in turn is pivoted to the operating lever 216, while the other end of the lever 213 is pivotally connected to a spool actuating bar 217.

In Fig. 22ª, I have shown one end of the well in section broken away and in which a tubular shell 218 is mounted and provided with a collar 219 with a set screw 220 therein, and 221 designates the shank portion of a socket member 222 adapted to receive the winged end of a spindle. Said socket member 222 has mounted thereon a grooved collar 223 engaged by the operating bar 224 and the angled end of the bar 217, which is recessed and straddles the shank portion 221 adjacent to the socket end thereof.

In Fig. 23, I have shown the lever 224 as mounted upon the trackerboard 197 having a forked end engaging the collar 223 while the angled end of the rod 217 engages the shank of the socket member 222.

Referring to Figs. 21, 22, 22ª and 23 of the drawings, it will be noted that, by the two operating bars for a single shaft, the upper spool will be moved independent of the lower spool for the purpose of making the music track. The upper bars of the upper spool and the two bars of the lower spool allow both spools to be moved together for the purpose of transposing music or changing the key. The two lower bars on the lower spool allow the movement of the lower spool to make the music run true and thus preventing the tearing of the paper.

In Fig. 24, I have shown a forked member 225ª held by means of a set screw 226 in adjusted position upon the rod 227 and which may be substituted for the angled end of the rod for moving the spools, as shown and described in the other figures.

In Fig. 14, I have shown a modification of my apparatus in which I illustrate a threaded shaft 228 having a movement within the tubular shaft 229 which passes through an aperture in the wall of the well and also through the plates 78 and 78ª. Said threaded shaft has a socket member 230 at one end for the reception of the winged ends of the spindle and the end of the spool, and 231 designates a collar which is held in an adjusted position upon the threaded shaft by means of a set screw 232. A grooved collar 233 is also mounted upon the threaded shaft inside the well, and 234 designates a threaded collar mounted upon said shaft and provided with a set screw 235 adapted to engage the threads of the shaft to hold the same in an adjusted position and also a set screw 236 which is mounted in a threaded holder in the collar and adapted to hold the pin 237 in an adjusted position. Said pin 237 is adapted to contact with the flange 238 upon the end of the spool and form a means for causing the spool to rotate with the collar. Said tubular shell 229 has a sprocket wheel 74 mounted thereon and also the fixed collars 76 and 80.

By the provision of the construction shown in Fig. 14, the shaft 228 will have a longitudinal movement for the purpose of allowing the use of spools of different lengths which engage the socket member upon the shaft when spools requiring socket members are used and when the spools are without the means for engagement with a socket member, the pin on the pin 237 is adapted to engage the winged end of the spool in co-operation together with the shaft.

In Fig. 15, I have shown the spindle carrying socket member illustrated in Fig. 1 of the drawings, as passing through the wall of the well with the spindle a spring, one end of which is fastened to the well and the other end is connected with the socket member and acts automatically throw said socket member back to their initial position after the movement caused by the spool.

In Fig. 16, I have shown a shank 240 and 241 the end of which is shaped to engage the spindle on the spool in the same way as the spool.

In Fig. 17, I have shown the shank portion 242 of the socket member 243 mounted in the shell 244, and 245 is a collar in detail of which is shown in Fig. 19, mounted upon the shank 242, and having a thumb screw 246 to hold the same in an adjusted position and also a second screw 247 for engagement with the pin 248. By the construction shown in said Fig. 17, the pin 248 serves the same purpose as shown in Fig. 14, although the pin 248 is adjustably held in a collar 245, the point of the pin being adapted to engage the end of the spool and cause the same to rotate with the socket member.

In Fig. 18, I have shown the tubular shell 249 as receiving a shaft 250 with a recess 251 at one end with a series of notches 252 formed therein adapted to receive a pin 253 mounted upon the spring 254, which latter is fixed to the tubular shell 249. Pin 256 is engaged by a lug 255 upon the spring 254 and held in place.

By the adjusting mechanism illustrated in Fig. 18, it will be observed that the socket member for holding the spindle of the pin 256 carried by the socket member or shell 249 may be adjusted longitudinally to adapt the device for holding reels or spools of different lengths and affording means whereby the spool may be reversed and held as before described with reference to the construction shown in Fig. 17 of the drawings.

The recessed end 251, of the shaft 250, is used to engage the sunken end of spools not having a spindle, and in such cases the shell 249 is removed, allowing the insertion of the shaft 250 in the spool.

The operation of my apparatus will be readily understood and is as follows:—When it is desired to play a piece of music in various keys, the operator, by moving the handle 63 shown in Fig. 1 of the drawings, may cause the two spools to be moved longitudinally in one direction against the tension of the springs 63 and 9. By glancing at the indicating card, shown in Fig. 25 of the drawings, which is fastened to the well in any convenient position, the operator may see by the series of numerals the number of perforations that the spools will have to be moved in one direction or the other to play in the particular key desired.

In Fig. 1 of the drawings, the parts are shown as being properly positioned for winding the perforated strip upon the lower spool and, in the event of it being desired to reverse the winding movement of the strip and cause the upper spool to be positively driven, the shaft 71 is moved longitudinally so that the gear wheel 70 will disengage the gear wheel 68, which movement will cause the pins 75 and 76 to contact with each other and drive the upper spool in direction to rewind the perforated sheet. Should it be desired to cause one spool to be moved independent of the other for any reason, such as, for instance, to cause the perforated sheet to wind evenly from one spool to another and to prevent tearing of the edge of the sheet which commonly happens with various forms of piano players, one of the levers which actuates one spool or another independently may be operated for this purpose and, by the provision of the sectional spools, may be adjusted for playing rolls of music having spools of different lengths.

In the musical art, it is well known that in pneumatic players as commonly constructed they are adapted to play music in the key in which the music is made only and it often happens that the music is not perforated or made in the best key or to the one most pleasing to the operator and hence it is desired to change the key and which may be accomplished by moving the music sheet to the right or left, thus allowing the music to be played in any number of keys from the one perforated sheet. By the provision of my improved apparatus, the movable spools and music sheet will enable the operator to play the music in any number of keys from the one sheet, no matter in what way it may be made, and the change from one key to another can be instantly effected while the music is running over the trackerboard, the movable spools being adapted to be moved to the right or left any desirable distance.

The indicator cards are graduated to correspond to the size of the apertures in the trackerboard and register the movement of the music sheet and spools to the right or left. The figures upon the cards, it will be understood, show how many semitones the music sheet is to be or is moved to the right or left and the letters show the key. By this arrangement of the letters in conjunction with the figures, any transposition desired may be made, while the pointers show how far the music sheet has been moved and also the key.

By the provision of an indicating card having the arrangement of letters and figures as shown, the operator may move the indicating pointer in order to adjust the key in which it is desired to play the piece.

The music may be transposed to any key and at will, regardless of the key in which it is perforated, by the provision of the indicator mechanism which may consist of stationary indicating cards, or dials, and movable pointers coöperating therewith. By this invention the spools may be moved to the right or left longitudinally to change the key, or they may be adjusted so as to make the perforations in the music sheet register with the holes in the trackerboard.

In operation, it will be understood that, as the ducts or tubes of the trackerboard or range communicate with pneumatic devices for given notes or tones of the instrument, the shifting of the music sheet across the trackerboard will change the key of the music which will be produced by the travel of the music sheet, a movement to the right having the effect to expose to the action of the perforated music sheet a range of notes higher up and raise the key, while a movement to the left for like reason will lower the key in which the music will be played. The spools not being fixed enables the operator to accurately and instantly adjust and move the spools and music sheet to lower or raise the key one or any number of semitones. As the pitch of the various suction holes of the trackerboard is uniform and corresponds to a semitone, it will be apparent that by moving the spools and music sheet longitudinally a distance equal to a hole in the trackerboard, it will have the effect of lowering or raising the key note of the musical composition a semitone and that the moving of the spools and music sheet twice this distance will produce a double effect and so on. For instance, let us suppose the accompaniment to a song is desired to be transposed into a key note that differs from the original by two semitones or by a whole note, the spools and music sheet are moved two holes and the music may be played in the desired key. There are thirteen sounds in the chromatic scale of an octave and the spools and music sheet may be moved in either direction any distance to suit any prepared music roll for effecting the player or the music. By the provision of adjustable and movable spools embodying the features of the present invention, perforated music sheets of various widths may be utilized and having any number of notes or rows of perforations, the adjustment of the means to the particular sheet of music being readily determined by the card and indicating pointer.

As it frequently happens that musical records for various reasons become distorted from exposure to atmospheric influences, one edge or the other of the sheet will shrink and expand, thus making it impossible to operate the instrument with such defective record strip but, by the provision of a movable roll spool and an adjustable end winding spool, not only will it be possible to play the piece in any key but the operator may move the same to the right or left to conform to irregularities due to shrinkage or other causes in the opposite edges of the perforated strip, thus allowing the same to wind truly upon the spools and with as little friction as possible.

It is understood that the graduations on the indicator card (Fig. 25) are the same size as the holes in the trackerboard.

The indicator card and pointer may be located in any part of the piano player instead of in the well.

The angle bars for adjusting the spools may be located outside of the well and be made to contact outside of the well at the right end of spindle rod 17 and at the right end of tubular shell 37 when necessary to preserve the beauty of the well or when more room is needed in the well.

The spools and music sheet may be adjusted to play in any key independent of the angle bars by means of the extension spindles in conjunction with the sectional take up spool should any of the bars become broken or inoperative.

As a rule there is a considerable margin of paper beyond the highest and lowest notes of the music sheet, so that the sheet permits of a certain amount of adjustment without uncovering any of the orifices in the trackerboard. If, however, the music sheet is moved so far as to uncover any of the orifices, they may be closed by a slide gravity curtain as shown in my Patent No. 9_,774, of May 10, 1910, or a gravity curtain of any stiff material that can be moved along over the end of the trackerboard and music sheet until it covers the exposed apertures can be used. It is always best to adjust the music sheet so that none of the notes of the air or melody are exposed.

While I have illustrated and described particular forms in which my invention may be embodied, I am aware that many modifications may be made therein by any person skilled in the art without departing from it. The method of supporting the music rolls and of making adjustable the winding roll and bars may be modified as will be understood by manufacturers in many different ways without departing from the scope of the invention and I do not wish to be limited to the construction shown.

While I have illustrated and described a sprocket chain as a preferred embodiment of the invention, I may use a bevel or frictional bearing, or other construction in the place of the sprocket chain. The adjusting levers and angle bars and rods may be used on the back, right side, or on other parts of the well or piano, instead of on the left side and in the well or spool holder. The levers may be lengthened, shortened, or differently shaped and fastened so as to move the spools with greater or less ease and accuracy and they may be made to move the spool end extensions on the outside of the well instead of inside of it, thus allowing the interior to be left clear of all mechanism not needed inside of it. The levers may be dispensed with and sliding bars, screw, or other means, used to move the spools, or they may be used under the keyboard of the piano and the indicators differently placed, or differently constructed, or they may have all of the keys longitudinally and vertically indicated, thus doing away with the necessity of moving the indicator when the music sheet is preforated in different keys. The winding and rewinding mechanism of the lower spool may be constructed differently and on the outside of the well or in the lower part of the piano and the same made to conform to differently constructed pianos or players. The lower or winding spool or its sections may be constructed so as to slide longitudinally on a solid or hollow shaft and be held and turned by a pin or collar with a pinion connecting the spool or its sections, thus allowing it to be turned and to slide longitudinally, and instead of the indentation number 42, Fig. 1, I may use a long pin fastened to the collar number 33 and which pin is inserted in a hole in the end of the spool and which will allow the spool to be moved to the right or left and also cause it to be held and turned with the shaft number 32. The angle bars 29 and 49, Fig. 1, may be constructed of one piece and have a handle or lever or bar for moving the spools. Screw adjustments may be attached to the angle bar or bars at either or both ends for independent adjustments. All of these modifications come within the domain of mechanical construction and adaptation and do not affect the essential features of the invention which is to provide improved and efficient means for regulating music rolls simultaneously and independently in player pianos, self playing musical instruments, perforators, and the like, to bring the music sheet correctly in alinement with the orifices of the tracker and the flanges or ends of the spools, and also to enable the transposing of the musical composition by shifting the perforated or slotted music sheet one or any number of notes to the right or left as may be desired and at will and to indicate by indicator and pointer and desired key or changes, and by this means rendering the musical composition effected pleasing to the ear, or to accompany the voice, or other musical instrument at all times and instantly and under all conditions of the atmosphere or condition of the music roll and spools.

Trackerboards or bars with two or more lines of orifices, such as 6 to the inch, 9 to the inch, or differently spaced, can be used with this device. The key indicating and adjustment means may be made in any convenient manner and the graduations, numbers, or letters, increased or decreased in size or width on the indicator cards or scales to suit the eye or the location of the indicator cards, and the means for pointing to the keys or graduations on the indicator scales may be changed by leverage or other means to correspond with the graduations on the indicators, or adjustments of the spools, music sheet or tracker.

By reference to Fig. 1 of the drawings, it will be noted that the two spools are adapted to be moved to the left by the tilting of the lever 58, which movement is caused by the angled wing of the plate 54 bearing against the nuts 56, causing the two bars 29 and 49 to move the spools under the tensions of the springs upon the spindles of the spools, and it will also be observed that each rod 29 and 49 may be adjusted independent of each other by means of the nuts 56. It will be noted that either bar 29 or 49 may be moved freely to the left, through the perforations in the wing of the plate 55, but when the nuts come into contact with the plate 55, a further movement of either to the right will cause each bar 29 and 49 to move together.

Referring to Fig. 26 of the drawings, the central column 260 of letters shows the keys in which a piece of music may be perforated. The longitudinal column, designated by numeral 261, shows the transposition keys into which a piece may be played by the movements of the spools to the right or left. The numerals at the bottom of Fig. 26 show the perforations from 0 to 12 which will designate the key. The spaces, designated by numeral 262, at the bottom of Fig. 26, designate the holes in the tracker-board which are to be used in conjunction with the numerals for changing the keys.

In Fig. 27 I have shown a view illustrating a gear construction instead of a sprocket chain and in which a gear wheel 263 is shown as keyed to a shell 264 which is mounted upon the adjustable spool shaft 265, which latter is provided with an elongated slot 266 through which a pin 267 passes which also passes through the shell 264 and serves as means for guiding said shaft 265 to adjust the spools to the right or left. A second gear wheel, designated by numeral 268, is fixed to a similar shell 269 which is mounted upon the spool shaft 270 and a pin 271 passes through an elongated slot in the shaft 270 and also through an aperture in the shell 269. Mounted upon a crank shaft 272, journaled in suitable bearings 273, is a crank shaft 274 to which is splined a gear wheel 275 which is fixed to a collar 276 movable upon the shaft by means of a lever 277 which is pivotally mounted upon a pin 278. 279 designates a motor having pitman connections 280 with said crank shaft 274 and forming means for driving the same. By the manipulation of the lever 277, the gear wheel 275 may be thrown into mesh with a gear wheel 281 journaled upon the bracket 282 and which gear wheel 281 is in mesh with the gear wheel 263 for the purpose of rewinding the spool and, if the gear wheel 275 is moved in the opposite direction, it may be thrown into mesh with the gear wheel 268 for the purpose of causing the music to wind upon the lower spool. In the construction shown in Fig. 27, I have illustrated in dotted lines and designated by numeral 270ᵃ a manner of mounting the angle bars 270ᵇ so that the ends of said bars may engage the end of the spool shaft instead of engaging the shaft in the manner shown in solid lines in said figure.

Referring to Fig. 28, I have shown a bevel gear connection between the motor and the spools and consisting of a beveled gear wheel 283 fixed to a shell 284 in a similar manner as illustrated in Fig. 28ᵃ and which gear wheel is in mesh with a beveled pinion 285 fixed to the vertically movable shaft 286. A pinion wheel 287 is also fixed to the shell 288 through which the shaft 286 has a longitudinally splined movement. A beveled pinion 289 is in mesh with the pinion 287, said wheel 289 being fixed to the crank shaft 290 driven by the motor 291. An operating lever 292 is pivotally connected to a lever 293 which is swiveled to the shell 294 which is keyed to the shaft 286. By the manipulation of said lever 292, it will be noted that the spools may be caused to wind in one direction or the other as may be desired.

What I claim to be new is:—

1. In combination with the well of a piano player, a tracker board therein, rotatable spools mounted in said well means for imparting independent longitudinal movements to the spools, and means for moving at will the spools simultaneously in longitudinal direction.

2. In combination with the well of a piano player, a tracker board therein, rotatable spools mounted in said well and means for causing independent longitudinal movements to be imparted to the spools, means for moving at will the spools together longitudinally and indicating means showing the adjustments of the spools.

3. In combination with the well of a piano player, a tracker board therein, rotatable spools journaled within said well and adapted to have independent longitudinal movements, means for moving said spools together longitudinally, one of said spools made up of independently movable, adjustable sections adapting the apparatus for playing sheets of music of different widths.

4. In combination with the well of a piano player, a tracker board therein, rotatable spools journaled within said well and adapted to have independent longitudinal movements, means for moving said spools together longitudinally, one of said spools made up of independently movable, adjustable sections adapting the apparatus for playing sheets of music of different widths, and indicating means for designating the longitudinal movements of the spools.

5. In combination with the well of a piano player, a tracker board therein, rotatable spools journaled within said well and adapted to have independent longitudinal movements, means for moving said spools together longitudinally, one of said spools made up of independently movable, adjustable sections adapting the apparatus for playing sheets of music of different widths, lever-actuated mechanism for moving the spools longitudinally, and indicating means for designating the longitudinal movements of the spools.

6. In combination with the well of a piano player, a tracker board therein, rotatable spools journaled within said well and adapted to have independent longitudinal movements, means for moving said spools together longitudinally, one of said spools made up of independently movable, adjustable sections adapting the apparatus for playing sheets of music of different widths, lever-actuated mechanism for moving the spools longitudinally, and a scale coöperating with said lever mechanism for indicating the adjustments of the spools.

7. In combination with the well of a piano player, a tracker board therein, rotatable spools journaled within said well and adapted to have independent longitudinal movements, means for moving said spools together longitudinally, one of said spools made up of independently movable, adjustable sections adapting the apparatus for playing sheets of music of different widths, an angle lever pivotally mounted upon the well, connections between the same and said spools for moving the latter longitudinally in one direction, springs for moving the spools in the opposite direction, a scale upon the well, a pivotal indicator movable over said scale and having pivotal connections with the angle lever.

8. In combination with the well of a piano player, having a trackerboard mounted therein, rotatable spools journaled in bearings in the well, one of said spools made up of sections having independent longitudinal movements, a longitudinally movable hollow shaft upon which the sectional spool is mounted, a solid shaft over which the hollow shaft telescopes, said sections having independent longitudinal movements to adapt the spool to different widths of music, mechanism for indicating the longitudinal movements of the spools, and means for causing the perforated sheet to wind from one spool to the other.

9. In combination with the well of a piano player, a trackerboard mounted therein, rotatable spools journaled within the well and upon which a perforated sheet of music is adapted to wind, means for moving the spools longitudinally to play pieces in different keys, one of said spools made up of relatively movable sections, a hollow shaft upon which said sections are mounted, a solid shaft upon which the hollow shaft is mounted, means for causing the two shafts to rotate together, and means for causing the perforated music sheet to wind upon either spool.

10. In combination with the well of a piano player, a trackerboard mounted therein, rotatable spools journaled within the well and upon which a perforated sheet of music is adapted to wind, means for moving the spools longitudinally to play pieces in different keys, one of said spools made up of independently movable sections, a hollow shaft upon which said sections are mounted, a solid shaft upon which the hollow shaft is mounted, means for causing the two shafts to rotate together, means for causing the perforated music sheet to wind upon either spool, and means for indicating the longitudinal movements of the spools.

11. In combination with the well of a piano player, a trackerboard mounted therein, rotatable spools journaled within the well and upon which a perforated sheet of music is adapted to wind, means for moving the spools longitudinally to play pieces in different keys, one of said spools made up of relatively movable sections, a hollow shaft upon which said sections are mounted, a solid shaft upon which the hollow shaft is mounted, means for causing the two shafts to rotate together, a gear wheel fixed to said solid shaft, a longitudinally movable shaft, a pinion upon the latter adapted to mesh with said gear wheel, and driving means for causing a perforated music sheet to wind upon either spool.

12. In combination with the well of a piano player, a yielding spindle receiving socket member and an adjustable socket member mounted in the well, a spool having spindle ends mounted in said socket members, a solid shaft journaled in the well, a hollow shaft telescoping over said solid shaft and having a longitudinal movement independent of the latter, a sectional spool mounted upon the hollow shaft, means for moving said hollow shaft and the spool mounted in said socket members simultaneously in longitudinal directions for playing pieces of music in different keys, and mechanism for causing the music sheet to wind upon either of the spools.

13. In combination with the well of a piano player, a yielding spindle receiving socket member and an adjustable socket member mounted in the well, a spool having spindle ends mounted in said socket members, a solid shaft journaled in the well, a hollow shaft telescoping over said solid shaft and having a yielding longitudinal movement independent of the latter, means for moving said hollow shaft and the spool mounted in said socket members longitudinally to play pieces of music in different keys, and means for causing the music sheet to wind upon one spool or the other.

14. In combination with the well of a piano player, a yielding spindle receiving socket member and an adjustable socket member mounted in the well, a spool having spindle ends mounted in said socket members, a solid shaft journaled in the well, a hollow shaft telescoping over said solid shaft and having a yielding longitudinal movement independent of the latter, means for moving said hollow shaft and the spool mounted in said socket members longitudinally to play pieces of music in different keys, and means for indicating the longitudinal movements of the spools.

15. In combination with the well of a piano player, a yielding spindle receiving socket member and an adjustable socket member mounted in the well, a spool having spindle ends mounted in said socket members, a solid shaft journaled in the well, a hollow shaft telescoping over said solid shaft and having a yielding longitudinal movement independent of the latter, means for moving said hollow shaft and the spool mounted in said socket members longitudinally to play pieces of music in different keys, means for indicating the longitudinal movements of the spools, a gear wheel fixed to said solid shaft, a longitudinal movable counter shaft journaled in suitable bearings in the well, a pinion upon said counter shaft and adapted to mesh with said gear wheel, a sprocket wheel upon said counter shaft, journaled in the well and adapted to rotate one of said spools, a shell rotating with said adjustable socket member, a sprocket wheel keyed to said shell, sprocket chain connections between said sprocket wheels, and means for causing the music sheet to wind upon either spool.

16. In combination with the well of a piano player, a yielding spindle receiving socket member and an adjustable socket member mounted in the well, a spool having spindle ends mounted in said socket members, a solid shaft journaled in the well, a hollow shaft telescoping over said solid shaft and having a yielding longitudinal movement independent of the latter, a spool made up of sections having relative longitudinal movements upon said hollow shaft, means for causing the sections to rotate with the latter, and means for moving the spools longitudinally for playing pieces of music in different keys.

17. In combination with the well of a piano player, a yielding spindle receiving socket member and an adjustable socket member mounted in the well, a spool having spindle ends mounted in said socket members, a solid shaft journaled in the well, a hollow shaft telescoping over said solid shaft and having a yielding longitudinal movement independent of the latter, said solid shaft having a longitudinal groove, a lug projecting from the inner surface of the hollow shaft and engaging said groove, a spool made up of sections mounted upon the hollow shaft and having relative longitudinal movements, means for holding the sections in different adjusted positions and adapting the latter for music sheets of different widths, and means for moving the spools longitudinally to play pieces in different keys.

18. In combination with the well of a piano player, a yielding spindle receiving socket member and an adjustable socket member mounted in the well, a spool having spindle ends mounted in said socket members, a solid shaft journaled in the well, a hollow shaft telescoping over said solid shaft and having a yielding longitudinal movement independent of the latter, said solid shaft having a longitudinal groove, a lug projecting from the inner surface of the hollow shaft and engaging said groove, a spool made up of sections mounted upon the hollow shaft and having relative longitudinal movements, said hollow shaft having a longitudinal groove, projections upon each of said sections engaging the groove in said hollow shaft and adapted to hold the sections in longitudinally adjusted positions, and means for moving the spools longitudinally to play pieces in different keys.

19. In combination with the well of a piano player, a yielding spindle receiving socket member and an adjustable socket member mounted in the well, a spool having spindle ends mounted in said socket members, a solid shaft journaled in the well, a hollow shaft telescoping over said solid shaft and having a yielding longitudinal movement independent of the latter, said solid shaft having a longitudinal groove, a lug projecting from the inner surface of the hollow shaft and engaging said groove, a spool made up of sections mounted upon the hollow shaft and having relative longitudinal movements, said hollow shaft having a longitudinal groove, projections upon each of said sections engaging the groove in said hollow shaft and adapted to hold the sections in longitudinally adjusted positions, means for moving the spools longitudinally to play pieces in different keys, a gear wheel fixed to said solid shaft, a longitudinally movable counter shaft journaled in the well, a pinion fixed to said counter shaft and adapted to mesh with said gear wheel, a shell in which one of said socket members is mounted, sprocket wheel and chain connections between said counter shaft and shell, clutch collars upon said shell and counter shaft, a rod connecting said collars, and means connected to said rod for moving the latter to cause a music sheet to wind upon either spool.

20. In combination with the well of a piano player, a fixed trackerboard mounted therein, spools upon which a perforated sheet of music is adapted to wind, movable bearings in which corresponding ends of the spools are mounted, a lever pivoted upon the end of the well, longitudinally movable bars secured to said lever, loosely mounted collars actuated thereby and adapted to move the spools simultaneously in different longitudinal positions, a graduated scale, an indicating pointer connected to said lever and adapted to be moved over said scale, as set forth.

21. In combination with the well of a piano player, a fixed trackerboard mounted therein, spools upon which a perforated sheet of music is adapted to wind, movable bearings in which the corresponding ends of the spools are mounted, a lever pivoted upon the end of the well, longitudinally movable bars having angled ends and mounted upon the trackerboard, loosely mounted collars designed to bear against the spools and engaged by said angled ends of the bars, a graduated scale upon the well, an indicating pointer positioned over said scale and having connections with said pivotal lever, as set forth.

22. In combination with the well of a piano player, a trackerboard fixed thereto, spools having yielding longitudinal movements in one direction upon which a perforated sheet of music is adapted to wind, spindles upon said spools, socket members engaged by said spindles, grooved collars upon said socket members, longitudinally movable bars mounted upon the trackerboard and engaging said grooved collars, an angle lever pivoted upon the well and adapted to actuate said bars, an indicating scale, a pointer movable over said scale and having connections with said angle lever.

23. In combination with the well of a piano player, a trackerboard fixed thereto, spools having yielding longitudinal movements in one direction upon which a perforated sheet of music is adapted to wind, spindles upon said spools, a socket member in which the spindle of one of said spools is mounted, a tubular shell mounted in one end of the well in which a shank portion of said socket member is splined, a sprocket wheel loosely mounted upon said shell, a clutch collar fixed to the shell, means for throwing the sprocket wheel into and out of gear with said clutch collar, a gear wheel rotating the other spool, a pinion adapted to mesh with said gear wheel to rotate the same in one direction, a longitudinally movable shaft upon which said pinion wheel is mounted, a sprocket wheel upon said shaft, and sprocket chain connections between the sprocket wheels.

24. In combination with the well of a piano player, a trackerboard mounted therein, longitudinally movable spools mounted in the well, and upon which a perforated sheet is adapted to wind, bars adapted to actuate said spools longitudinally, a movable lever mounted upon the well, a plate to which said bars are fastened and having sliding pivotal connection with said lever, and means for tilting said lever.

25. In combination with the well of a piano player, a trackerboard mounted therein, longitudinally movable spools mounted in the well, and upon which a perforated sheet is adapted to wind, bars adapted to actuate said spools longitudinally, a movable lever mounted upon the well, a plate to which said bars are fastened and having sliding pivotal connection with said lever, an indicating scale upon the well, a pivotal pointer coöperating therewith, and a rod connecting said pointer with the tilting lever.

26. In combination with a frame, a trackerboard and rotatable flanged spools mounted therein, adjustable means for mounting spools of different lengths to allow the use of music sheets of different widths, means for moving the spools together longitudinally for transposing and changing the key, independent means for moving one of the spools longitudinally to cause the music to track, and independent means for moving the other spool longitudinally to effect a true winding of the music sheet and preventing the flanges of the spools from tearing the edges of the music sheet.

27. In combination with the well of a piano player, a trackerboard, spools for winding and rewinding a music sheet, adjustable means for holding said spools, means for moving the spools longitudinally for transposing or changing the key and indicating means for designating the key and movements of the spools and the music sheet, additional adjustable means for moving the music holding spool longitudinally for the purpose of changing the key or to make the music sheet track, said winding spool made up of sections with centering and indicating means and adapted for using music sheets of different widths and additional adjustable means for moving said sections longitudinally to make the music sheet run true to prevent tearing the edges of the latter when playing or rewinding.

In testimony whereof I hereunto affix my signature in the presence of two witnesses.

MARION F. HOLDERMAN.

Witnesses:
A. L. HOUGH,
ANNA C. BLAKENEY.